UNITED STATES PATENT OFFICE.

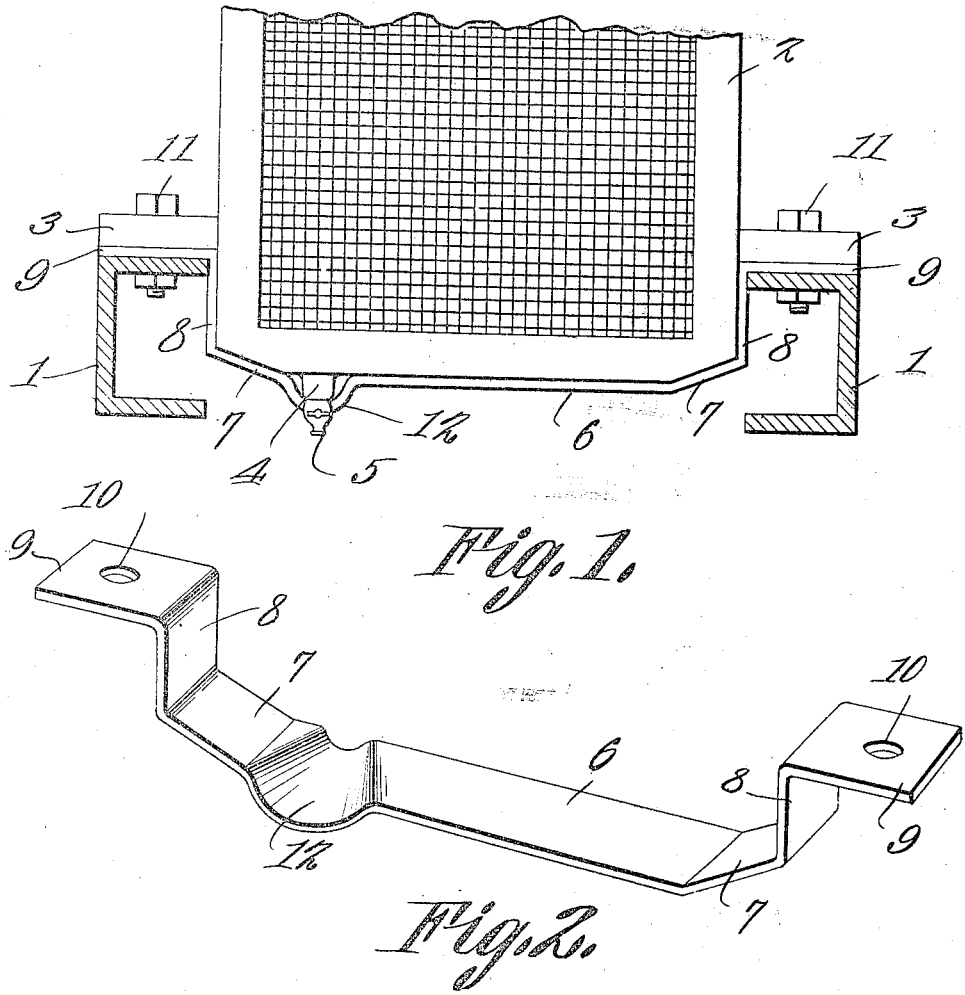

WILLIAM PETERSON, OF SARGENT, NEBRASKA.

RADIATOR-SUPPORT FOR AUTOS.

1,161,722.  Specification of Letters Patent.  Patented Nov. 23, 1915.

Application filed May 8, 1915. Serial No. 26,843.

*To all whom it may concern:*

Be it known that I, WILLIAM PETERSON, a citizen of the United States, residing at Sargent, in the county of Custer and State of Nebraska, have invented a new and useful Radiator-Support for Autos, of which the following is a specification.

The device forming the subject matter of this application is a brace adapted to be placed beneath the radiators of Ford automobiles, for the purpose of upholding and strengthening the radiators, so that the same will not sag, become strained, and leak after a protracted period of use.

It is the object of the invention to provide a simple brace whereby the results above mentioned may be brought about, novel means being provided for assembling the brace with the radiator and with the frame of the vehicle, and the brace being so constructed that it will coöperate properly with the radiator and its parts.

In the accompanying drawings:—Figure 1 shows the invention in front elevation, applied to the radiator and the frame of a vehicle, the frame being in section; Fig. 2 shows in perspective, the brace forming the subject matter of this application.

In the drawings, the numeral 1 indicates the side bars or chassis of a Ford automobile, the radiator being designated by the reference character 2, and the numeral 3 indicating the side flanges of the radiator. The radiator 2 is equipped with a depending connection 4, carrying a drain cock 5, as usual, and as clearly understood by those skilled in the art.

In carrying out the present invention there is provided a brace, shown in outline and in Fig. 2, and preferably made of mild steel. The brace may be of any desired width and thickness, but comprises an intermediate portion or base 6 which is straight throughout the major portion of its length, the ends of the base 6 being upturned at an angle, to form extensions 7 terminated in vertical arms 8 having rectangularly disposed, horizontally positioned flanges 9 equipped with openings 10.

In practical operation, the flanges 9 rest on the side bars 1 of the chassis, and the flanges 3 of the radiator 2 rest on the flanges 9. Through the flanges 3 and 9 and through the upper portions of the side bars 1 of the chassis are passed securing elements which preferably are in the form of bolts 11. The upright arms 8 of the brace engage the inner edges of the side bars 1 of the chassis, the inclined parts 7 of the brace coact with the angles at the lower corners of the radiator 2, and the lower portion of the radiator rests on the base 6. The connection 4 above alluded to, is received in a depressed seat 12 formed in the base 6 of the brace, the seat 12 preferably tapering from its forward end toward its rear end, as will be clearly understood from Fig. 2.

Having thus described the invention, what is claimed is:—

In a device of the class described, a vehicle frame; a brace comprising flanges resting on the frame, and a depending portion embodying upright arms engaging the frame, the depending portion of the brace being provided with a transverse seat; a radiator conforming to the depending portion of the brace, the radiator having a connection received in the seat, and being provided with outstanding flanges superposed upon the flanges of the brace and coacting therewith to prevent an undue pressure of the radiator upon the brace at the point where the connection is received in the seat, the radiator engaging the arms to prevent a lateral movement of the connection in the seat; and securing elements uniting the flanges of the radiator, the flanges of the brace and the frame.

In testimony that I claim the foregoing as my own, I have hereto affixed my signature in the presence of two witnesses.

WILLIAM PETERSON.

Witnesses:
C. H. KIKER,
O. G. BAUER.